(12) United States Patent
D'Angelo et al.

(10) Patent No.: US 12,624,997 B2
(45) Date of Patent: May 12, 2026

(54) HYPERSPECTRAL IMAGING DEVICE AND METHOD

(71) Applicant: Università degli Studi di Bari Aldo Moro, Bari (IT)

(72) Inventors: Milena D'Angelo, Bari (IT); Augusto Garuccio, Bari (IT); Gianlorenzo Massaro, Bari (IT); Francesco Vincenzo Pepe, Bari (IT)

(73) Assignee: Università degli Studi di Bari Aldo Moro, Bari (IT)

( * ) Notice: Subject to any disclaimer, the term of this patent is extended or adjusted under 35 U.S.C. 154(b) by 175 days.

(21) Appl. No.: 18/257,317

(22) PCT Filed: Dec. 17, 2020

(86) PCT No.: PCT/IB2020/062131
§ 371 (c)(1),
(2) Date: Jun. 14, 2023

(87) PCT Pub. No.: WO2022/130001
PCT Pub. Date: Jun. 23, 2022

(65) Prior Publication Data
US 2024/0053199 A1 Feb. 15, 2024

(51) Int. Cl.
*G01J 3/28* (2006.01)
*G01J 3/02* (2006.01)

(52) U.S. Cl.
CPC ........... *G01J 3/2823* (2013.01); *G01J 3/0208* (2013.01); *G01J 3/021* (2013.01); *G01J 3/2803* (2013.01)

(58) Field of Classification Search
CPC .... G01J 3/36; G01J 3/2823; G01J 2003/2826; G01J 3/14; G01J 3/18; G01J 3/0208; G01J 3/0248
See application file for complete search history.

(56) References Cited

U.S. PATENT DOCUMENTS

| | | | |
|---|---|---|---|
| 2006/0146325 A1* | 7/2006 | Wachsmuth | ....... G02B 21/0072 356/318 |
| 2008/0088838 A1* | 4/2008 | Raicu | .................... G02B 21/16 356/318 |

(Continued)

FOREIGN PATENT DOCUMENTS

| | | | |
|---|---|---|---|
| CN | 108254072 A | * | 7/2018 |
| WO | 2020194025 A1 | | 10/2020 |

OTHER PUBLICATIONS

Di Lena, F.; Pepe, F.V.; Garuccio, A.; D'Angelo, M. Correlation Plenoptic Imaging: An Overview. Appl. Sci. 2018 (Year: 2018).*

(Continued)

*Primary Examiner* — Kara E. Geisel
*Assistant Examiner* — Christina I Xing
(74) *Attorney, Agent, or Firm* — RMCK Law Group PLC

(57) ABSTRACT

A hyperspectral imaging device and method disclosed herein overcomes technical problems associated with the prior art by replacing the intensity measurement performed by the single high-resolution 2D sensor of state-of-the-art methodologies, with the measurement of intensity (fluctuation) correlations retrieved by two high-resolution 2D sensors: one—the imaging/spatial sensor dedicated to polychromatic image acquisition, the other—the spectral sensor dedicated to pure spectral measurement. In the hyperspectral correlation imaging disclosed herein, the spectral information is encoded into the intensity correlation without requiring any spectral scanning. Even though multiple exposures (frames) are generally required to reconstruct light statistics and perform correlation measurements, the exposure times are several orders of magnitude shorter than those required in the scanning approach. In addition, no changes of the device are required during such multiple exposures, which simpli- (Continued)

fies the optics/optomechanics of the device and avoids further time consumption.

17 Claims, 9 Drawing Sheets

(56) References Cited

U.S. PATENT DOCUMENTS

| | | | |
|---|---|---|---|
| 2011/0222054 A1* | 9/2011 | Krishnamachari | G01J 3/36 356/301 |
| 2015/0116526 A1* | 4/2015 | Meng | H04N 23/951 348/218.1 |
| 2019/0273850 A1* | 9/2019 | Fahringer | H04N 23/957 |
| 2020/0184624 A1* | 6/2020 | Jang | G01J 3/021 |

OTHER PUBLICATIONS

Z. Xiong, L. Wang, H. Li, D. Liu and F. Wu, "Snapshot Hyperspectral Light Field Imaging," 2017 IEEE Conference on Computer Vision and Pattern Recognition (CVPR), Honolulu, HI, USA, 2017, pp. 6873-6881, doi: 10.1109/CVPR.2017.727. (Year: 2017).*

Chen Xi-Hao et al: Sub-Rayleigh resolution ghost imaging by spatial low-pass filtering 11, Optics Letters, vol. 42, No. 24, Dec. 15, 2017 (Dec. 15, 2017), p. 5290, XP55835672, US, ISSN: 0146-9592, DOI: 10.1364/OL.42.005290 p. 1-2, right-hand columb, last paragraph; Figure 1.

Francesco Di Lena et al: "Correlation Plenoptic Imaging between Arbitrary Planes", arxiv .org, Cornell University Library, 201 Olin Li Bra Ry Cornell University Ithaca, NY 14853, Aug. 4, 2020 (Aug. 4, 2020), XP081733188, Figure 1, p. 1-6, paragraph 1.

Xiong Zhiwei et al: "Snapshot Hyperspectral Light Field Imaging", 2017 IEEE Conference on Computer Vision and Pattern Recognition (CVPR), IEEE Computer Society, US, Jul. 21, 2017 (Jul. 21, 2017), pp. 6873-6881, XP033250053, ISSN: 1063-6919, DOI: 10.1109/CVPR.2017.727 [retrieved on Nov. 6, 2017] figures 1-2, p. 3270-p. 3273, left-hand column last paragraph.

International Search Report dated Sep. 10, 2021. 13 pages.

* cited by examiner $$\frac{1}{S_{OBJ}} + \frac{1}{S_I} = \frac{1}{f}$$

$$\frac{1}{S_{OBJ}} + \frac{1}{S_I} = \frac{1}{f}$$

HYPERSPECTRAL IMAGING DEVICE AND METHOD

CROSS-REFERENCE TO RELATED APPLICATION

This application is a 371 National Stage of International Application No. PCT/IB2020/062131, filed Dec. 17, 2020. The disclosure of the above application is incorporated herein by reference in its entirety.

FIELD OF THE INVENTION

The present invention relates to hyperspectral imaging.

PRIOR ART

Current devices for hyperspectral imaging rely on intensity measurements performed by a high-resolution 2D sensor, and are essentially based on the two complementary concepts of scanning and snapshot imaging. The general problem of such devices is to encode on a 2D sensor an information that is in fact three-dimensional, the third dimension being the frequency of light.

In scanning hyperspectral imaging techniques, a high-resolution 2D sensor acquires, in time, a sequence of monochromatic images, one for each frequency within the range of interest; examples of scanning hyperspectral systems include point scanning spectrometers, pushbroom spectrometers, tunable filter cameras, Fourier transform imaging spectrometers, computed tomography hyperspectral imaging spectrometers, and coded aperture line imaging spectrometers. The drawback of this approach is clearly the amount of time required for acquiring the sequence of monochromatic images.

On the other hand, in snapshot hyperspectral imaging techniques, a high-resolution 2D sensor is divided into multiple 2D blocks of pixels, each block containing information on all the desired frequencies, one for each pixel; examples of snapshot hyperspectral systems include integral field spectrometry with faceted mirrors, with coherent fiber bundles and with lenslet arrays, multispectral beamsplitting, computer tomography imaging spectrometry, multiaperture filtered cameras, tunable echelle imagers, spectrally resolving detector arrays, image-replicating imaging spectrometers, coded aperture snapshot spectral imagers, image mapping spectrometry, snapshot hyperspectral imaging Fourier transform spectrometers, multispectral Sagnac interferometers. Here, the fast parallel acquisition of the desired multispectral images comes at the price of a sacrificed image and spectral resolution.

Hence, the scanning approach entails an extremely time-consuming process to achieve a fine spectral resolution, while the snapshot approach is characterized by a strong trade-off between spatial and spectral resolution, which, for a given sensor, are inversely proportional to each other.

OBJECT OF THE INVENTION

The object of the present invention is to solve the technical problems mentioned in the foregoing. More specifically, the object of the invention is to provide a high resolution hyperspectral imaging device and method capable of achieving high image resolution with a fast processing rate.

SUMMARY OF THE INVENTION

The object of the invention is achieved by a device and a method having the features of the appended claims, which form an integral part of the technical disclosure herein provided in relation to the invention.

BRIEF DESCRIPTION OF THE FIGURES

Further features and advantages of the invention will become apparent from the following description with reference to the annexed drawings, given purely by way of non limiting example, wherein:

FIG. 7 is a schematic representation of a device according to yet further embodiments of the invention.

DETAILED DESCRIPTION

Figure 1:
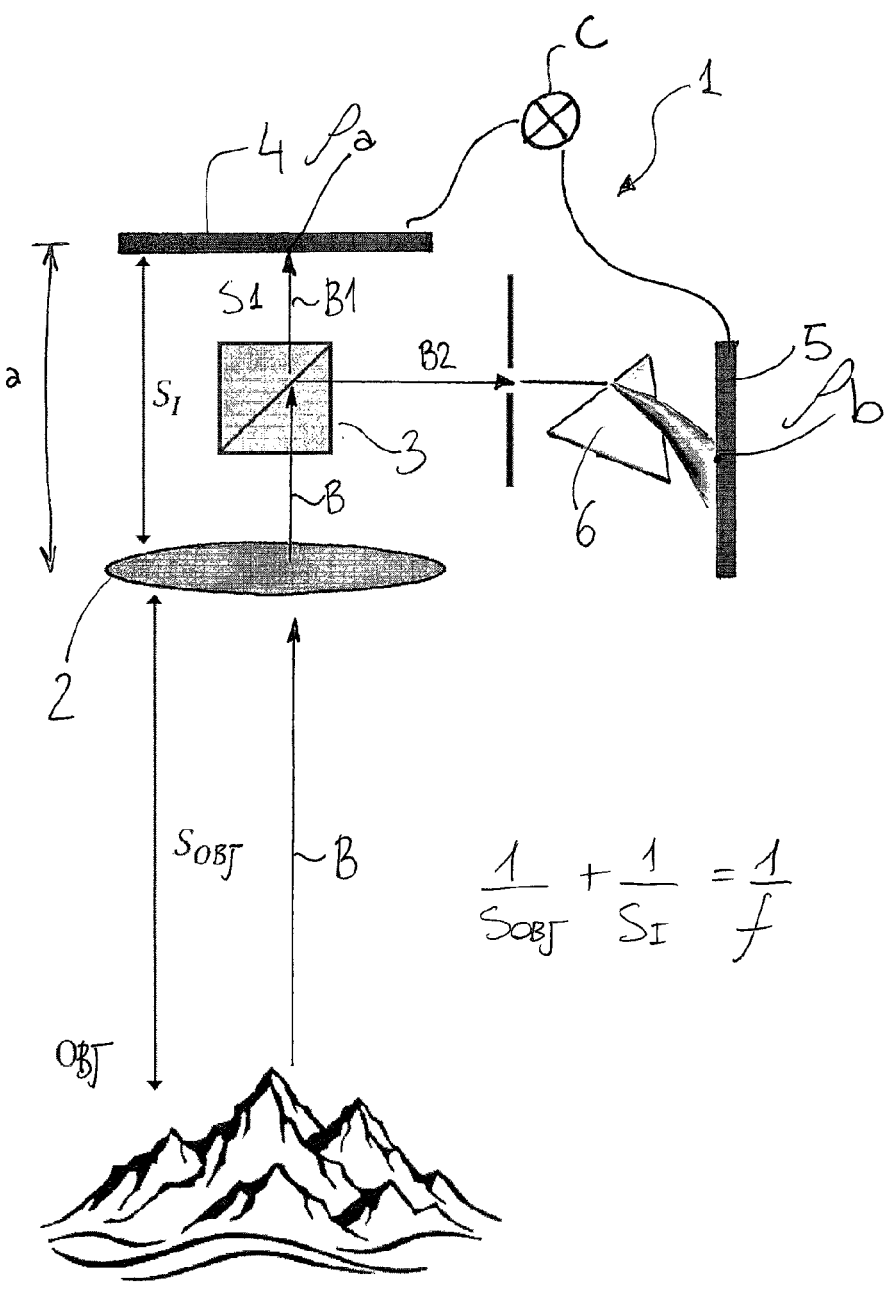
FIG. 1 is a schematic representation of a device according to embodiments of the invention

Reference number 1 in FIG. 1 designates as a whole a device for hyperspectral imaging according to embodiments of the invention. The device 1 includes an acquisition window 2, a beam splitter 3 configured for splitting a light beam B, coming from an object OBJ and entering the acquisition window, into a first secondary beam B1 traveling a first optical path S1 and including a plurality of first secondary light signals, and a second secondary beam B2 traveling a second optical path S2 and including a plurality of second secondary light signals. Generally speaking, the object OBJ may be regarded as a light source for the device 1 according to the invention, whereby each and every single point of the volume of the object OBJ is capable of emanating primary light signals of the light beams B.

The whole image of the object is the compound of all the light signals emanating from the object OBJ and collected through the acquisition window 2. Therefore, while the functional description that follows is based on figures representing a single primary light signal emanating from the object OBJ, and processed into secondary light signals, the functional description applies to the full primary light beam B emanating from the object, which comprises all of the primary, point-based, light signals (and accordingly to the full secondary light beams B1, B2 comprising all of the respective first and second secondary light signals). In embodiments, the beam splitter 3 is arranged in proximity of the acquisition window 2 downstream of the optical path of the primary light beam B, so to be impinged by the beam B to provide a splitting thereof into first and second secondary beams B1 and B2. In other embodiments, however, the arrangement may vary due, for instance, to space or installation requirements.

In other embodiments, as will become apparent in the following, there is little or no proximity between the beam splitter 3 and the acquisition window, with the device relying on a more complex optical path between the acquisition window and the beam splitter. In general—this applying to all of the embodiments herein—the acquisition window may be a simple flat screen with no optical path modification capabilities, thereby resulting in configurations wherein no further optical element is arranged between the acquisition window and the beam splitter or else configurations wherein one or more optical elements (lenses) are arranged between the acquisition window and the beam splitter, or it may be a lens element or a multiple lens set to provide a desired degree of processing of the primary light beam B prior to hitting the beam splitter 3.

The device 1 further includes a first sensor 4 configured to be impinged by the first secondary beam B1 and a second sensor 5 configured to be impinged by the second secondary beam B2. Throughout the description, for reasons which will become apparent in the following, sensor 4 may be referred to as "spatial sensor", while sensor 5 may be referred to as "spectral sensor". A correlator C is operatively connected to the sensors 4 and 5 to perform correlation of light intensity data/information retrieved by the sensors. A frequency splitter device 6 is arranged along the second optical path S2 and is configured to split the second secondary beam B2 into frequency components thereof prior to impingement onto the second sensor 5. In this embodiment, the frequency splitter device comprises a prism.

According to the invention, the first sensor 4 is configured to retrieve, from the first secondary beam B1, an image of the object OBJ, the image (2-D) comprising a plurality of spatial locations, each defined by the impingement of a respective first light signal of the secondary beam B1 onto the first sensor 4. In other words, the first sensor 4 is an imaging sensor that—once hit by light signals from the object OBJ—is configured to reconstruct an image of the object OBJ by means of the interaction between the primary light signals making up the primary light beam B (secondary signals making up the secondary beam B1) and the sensor elements thereof when the latter are impinged by the former. The image (2-D) of the object OBJ is formed on the sensor 4 through, for example, a focusing element comprising one of a lens (simple, composite, lens set), a curved mirror (spherical or parabolic), a dioptric reflecting system, or a system comprising lenses and mirrors. For example, when the acquisition window 2 comprises a focusing lens (or when a focusing lens is provided at locations impinged either by the primary beam B, or by the first secondary beam B1), the relationship $$\frac{-1}{S_{OBJ}} + \frac{1}{S_I} = \frac{1}{f}$$

applies in order to acquire a focused image of the object on the first sensor 4, wherein f is the focal length of the lens, $S_{OBJ}$ is the distance between a focused plane of the object OBJ and the principal plane of the lens, $S_I$ is the distance between the principal plane of the lens and the sensor 4.

On the other hand, the second sensor 5 is configured to retrieve from the second secondary beam B2 originating from the light beams B from the object OBJ, and for each spatial location of the image of the object OBJ, a frequency spectrum information. In other words, as each light signal making up the beam B2 is paired to a corresponding light signal making up the beam B1 by the beam splitter 3, the light signal from the beam B2 inherently carries the spatial information of the light signal from the beam B1, but it is used to encode information in the frequency domain. In yet other words, while the detection of a light signal from the beam B1 by the sensor 4 returns an image of the point of the object OBJ where the respective light signal of light beam B comes from (the secondary beam B1 originates from the very beam B), the detection of the paired light signal of the beam B2 by the sensor 5 returns spectral data for the same point of the object OBJ.

The "physical" dimension of the two data set (image and spectral) may not be—and usually are not—identical: while the image data are based on a one-to-one correspondence between each pixel (or sensor element in general) of the sensor 4 and a specific area on the object, as concerns the spectral data, information on the same frequency or frequency band may be stored in multiple pixels (e.g. in arrays of pixels). Pairing of the two data set—which are, as disclosed above, representative of physically paired quantities (pairing is inherent in the creation of secondary beams B1 and B2 through the beam splitter, given the chaotic nature of the light from the object OBJ) is achieved though the correlator C.

In some embodiments, one or more wavelength converters (e.g., a coating) may be associated to the sensor 5 to convert the wavelength(s) of the incident light into wavelength(s) at which the sensor 5 operates with higher sensitivity. A control system may then be used to rebuild the "actual" spectral information by taking into account the conversion ratio of the converters.

Additionally, in embodiments the frequency splitter device may be provided as a set of dichroic mirrors configured to divert each frequency band to a respective sensor 5: in such embodiments, accordingly, the spectral sensors may be more than one.

Furthermore, with reference to FIGS. 2 to 9, the device according to the invention may be susceptible of constructional changes while still maintaining the functional features mentioned in the foregoing. For this reason, FIGS. 2 to 5 provide a display of further embodiments designated by references 100, 200, 300, 400, 500, 600, 700, 800 and wherein the components identical to those already disclosed in connection with FIG. 1 are marked with the same reference number, while the components that are varied as compared with those of FIG. 1 are marked with a reference number in the same range as the main reference number designating the embodiment and accordingly offset from the corresponding feature or numbering of the embodiment of FIG. 1.

Figure 2:
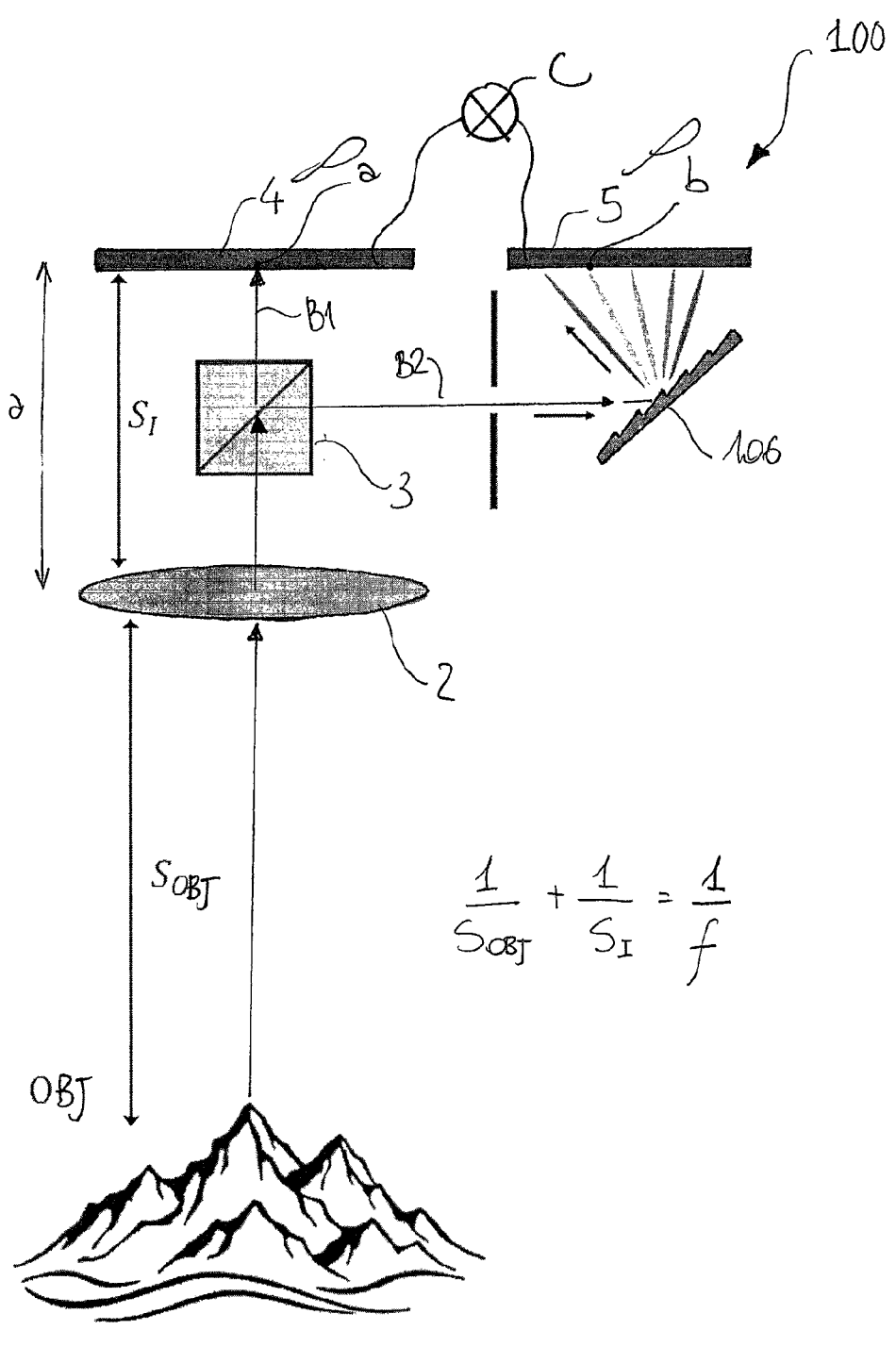
FIG. 2 is a schematic representation of a device according to further embodiments of the invention

With reference to FIG. 2, the device 100 according to the invention is identical to the device 1, except in that the frequency splitter device is designated as 106 and comprises a diffraction grating. The correlator C is, as with the device 1, operatively connected to the sensors 4 and 5 to perform correlation of light intensity data/information retrieved by the sensors.

Figure 3:
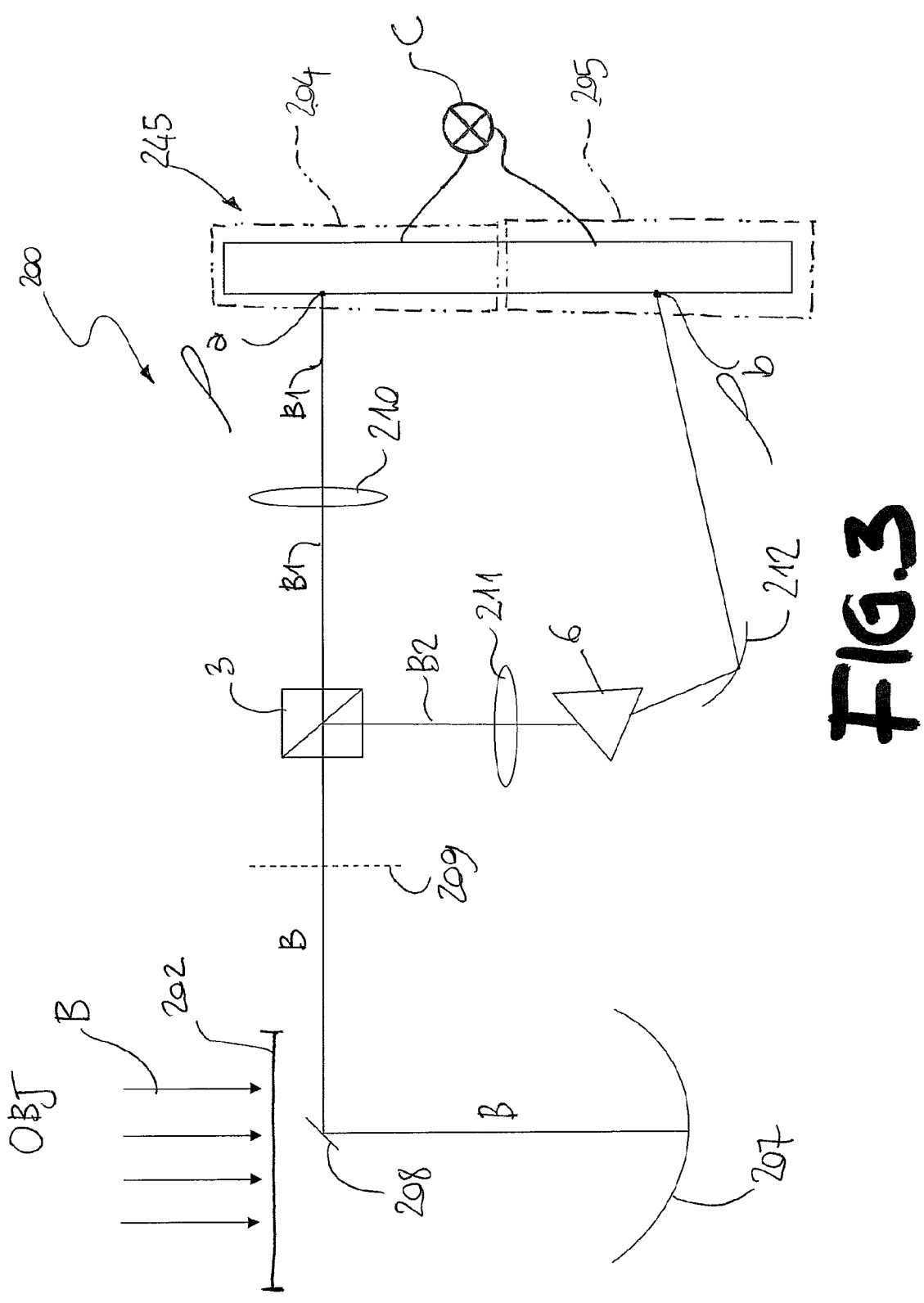
FIG. 3 is a schematic representation of a device according to yet further embodiments of the invention

The embodiment of FIG. 3, wherein the device according to the invention is designated by reference number 200, is exemplary of embodiments wherein the first (or imaging) sensor and the second (or spectral) sensor are provided on a single sensor element 245 and correspond to different sensitive areas or elements of the sensor element 245. In this particular embodiment, the imaging sensor is designated by reference 204 and corresponds to a first area of the sensor element 245, while the spectral sensor is designated by reference 205 and corresponds to a second area of the sensor element 245, adjacent to the first area. The sensor areas are disjoint, namely the optical arrangement of the device 200 is such that there are no intersections between the secondary beams B1 and B2 that impinge upon the sensors 204, 205. The correlator C is, as with the previous embodiments, operatively connected to the sensors 205 and 204 to perform correlation of light intensity data/information retrieved by the sensors.

The device 200 also includes additional components that result in a partially modified optical path. This may be exemplary of alternative arrangements wherein the optical path is adapted to certain requirements or constraints possibly dictated by the application concerned.

The device 200 includes an acquisition window 202 which, unlike the device 1 or the device 100, is not in view of the beam splitter 3. Conversely, the acquisition window 202 is arranged facing a parabolic mirror 207 configured to reflect the incoming (through the acquisition window 2) light beams B from the object OBJ to a deviation mirror 208 (preferably a plan mirror), wherefrom the light beam B is focused (209) either before or after the beam splitter 3. The first secondary beam B1 has an optical path S1 traversing an imaging lens 210, which may be per se optional, while the second secondary beam B2 has an optical path S2 traversing a collimation lens 211 which is arranged upstream of the frequency splitter 6 (a prism, preferably, but a diffraction grating can be used as well).

A second, far field, mirror (preferably a parabolic mirror) 212 is arranged downstream of the frequency splitter 6 to divert the split frequency components of secondary beam B2 to the spectral sensor 205.

Figure 4:
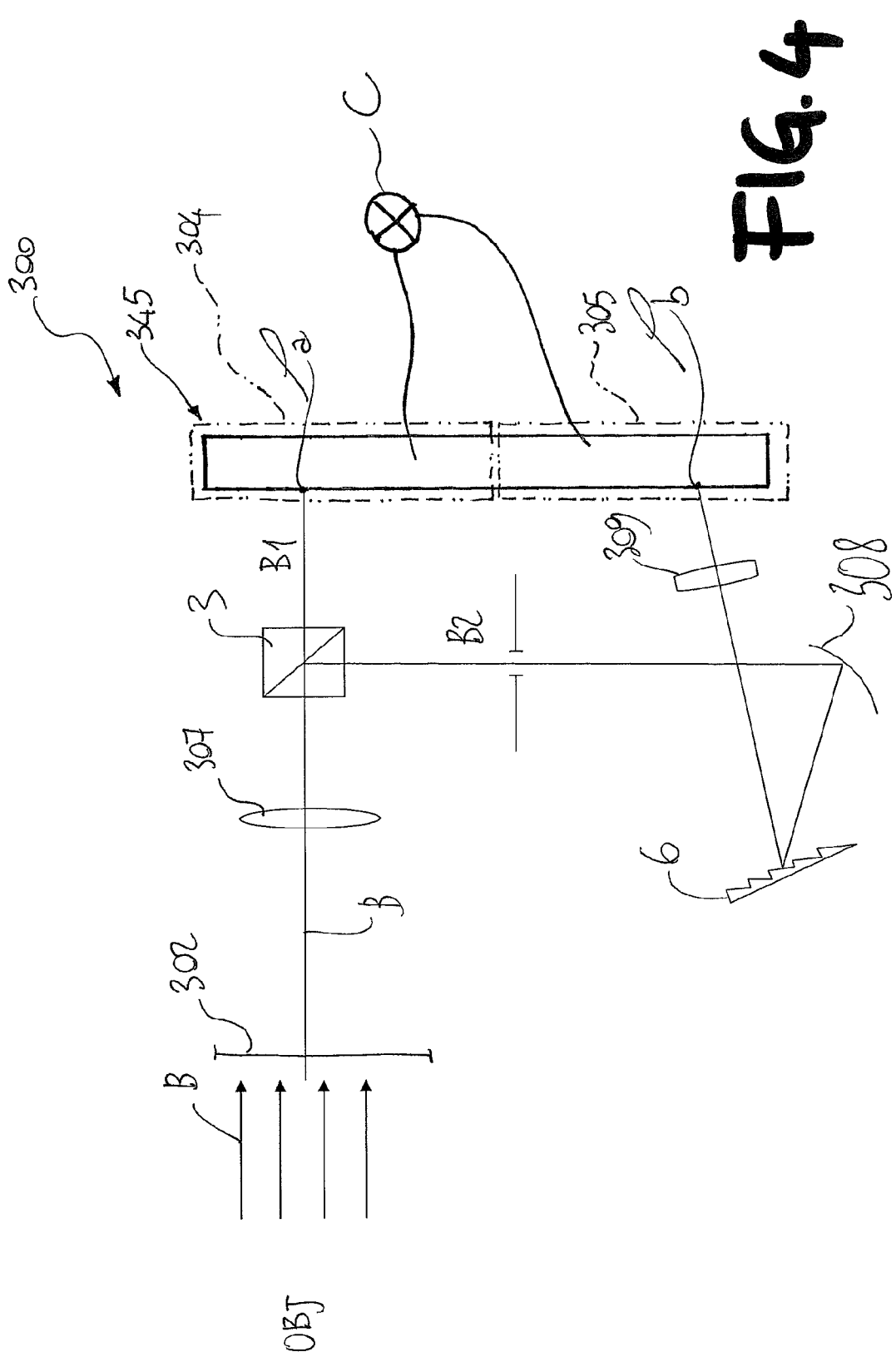
FIG. 4 is a schematic representation of a device according to yet further embodiments of the invention.

With reference to FIG. 4, yet a further embodiment of the device according to the invention is designated by reference number 300. In the device 300 the same functional layout of the embodiment of FIG. 2 is implemented, but the imaging sensor (reference number 304) and the spectral sensor (reference number 305) are again provided on a single sensor element 345 and correspond to different sensitive areas or elements of the sensor element 345. In this particular embodiment, the imaging sensor 304 corresponds to a first area of the sensor element 345, while the spectral sensor is designated by reference 305 and corresponds to a second area of the sensor element 345, adjacent to the first area. As with the previously disclosed embodiments, the sensor areas are disjoint, namely the optical arrangement of the device 300 is such that there are no intersections between the secondary beams B1 and B2 that impinge upon the sensors 304, 305. The correlator C is, as with the previous embodiments, operatively connected to the sensors 304 and 305 to perform correlation of light intensity data/information retrieved by the sensors.

Similar to the device 200, the device 300 also includes additional components that result in a partially modified optical path as compared to FIG. 1. This—again—may be exemplary of alternative arrangements wherein the optical path is adapted to certain requirements or constraints possibly dictated by the application concerned.

The device 300 includes an acquisition window 302 which, like the device 1, is in view of the beam splitter 3, preferably through an imaging lens 307 interposed between the acquisition window 302 and the beam splitter 3.

The primary light beam B from the object OBJ is split into a first secondary beam B1 with an optical path S1 ending up on the imaging sensor 304, and a second secondary beam B2 with an optical path S2 impinging onto a collimating mirror 308 (preferably parabolic) which is configured to reflect the beam B2 to the frequency splitter 6. From the latter, the optical path S2 is diverted to the spectral sensor 305, while also traversing a far field lens 309.

Figure 5:
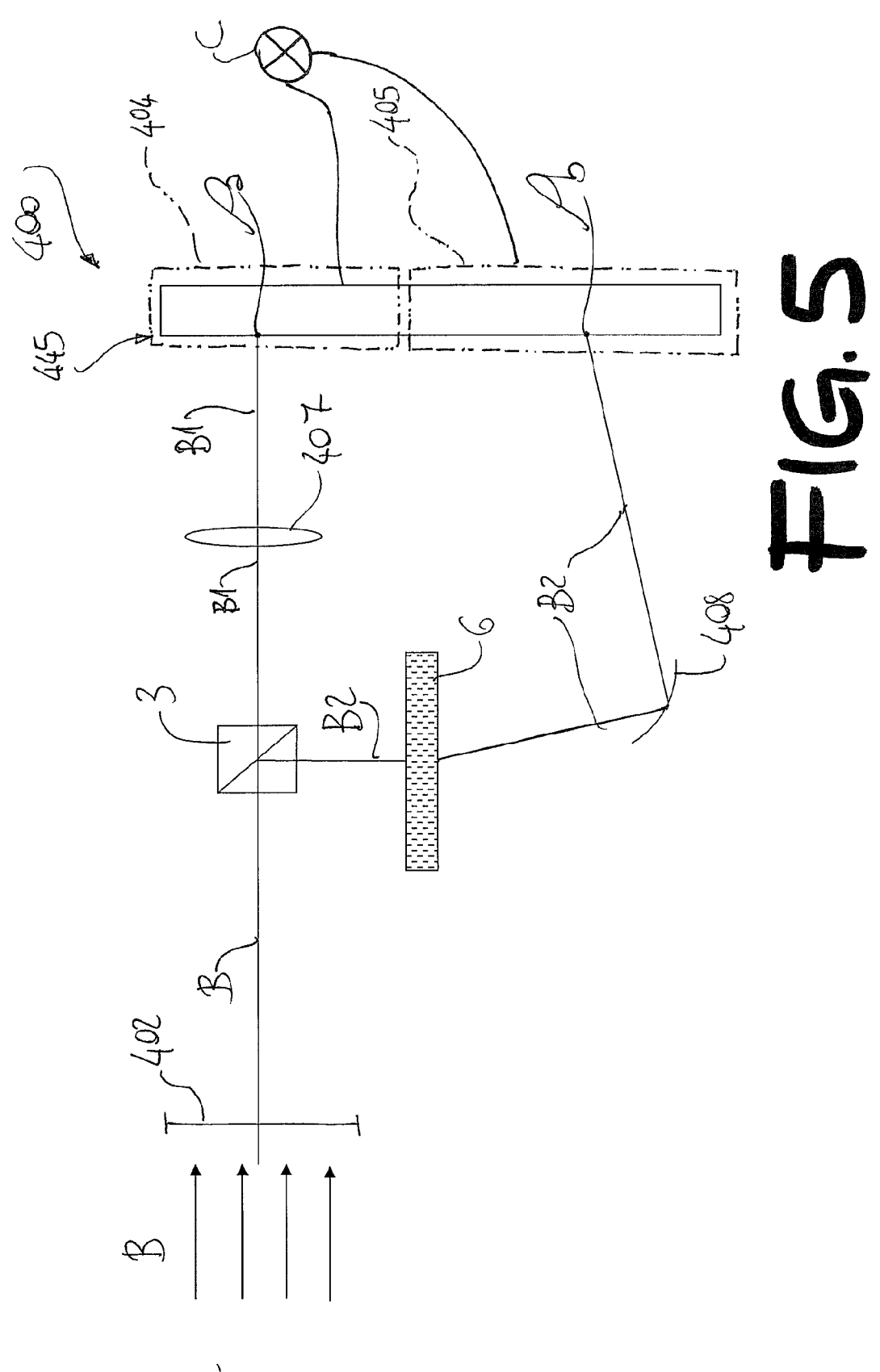
FIG. 5 is a schematic representation of a device according to yet further embodiments of the invention.

With reference to FIG. 5, yet a further embodiment of the device according to the invention is designated by reference number 400. In the device 400 the functional layout of the embodiment of FIG. 3 is slightly varied as detailed in the following. At any rate, as far as the sensor section is concerned, the device 400 features the same layout as the device 200, with an imaging sensor 404 and a spectral sensor 405 provided on a single sensor element 445 and correspond to different sensitive areas or elements of the sensor element 445. In this particular embodiment, the imaging sensor 404 corresponds to a first area of the sensor element 445, while the spectral sensor 405 corresponds to a second area of the sensor element 445, adjacent to the first area. As with the previously disclosed embodiments, the sensor areas are disjoint, namely the optical arrangement of the device 400 is such that there are no intersections between the secondary beams B1 and B2 that impinge upon the sensors 304, 305. The correlator C is, as with the previous embodiments, operatively connected to the sensors 405 and 404 to perform correlation of light intensity data/information retrieved by the sensors.

The device 400 includes an acquisition window 402 which comprise a lens or a set of lenses. The window 402 is in view of the beam splitter 3, so that the primary light beam B from the object OBJ are split into the first secondary beam B1 with an optical path S1 traversing a second lens 407 and ending up on the imaging sensor 404, and a second secondary beam B2 with an optical path S2 directly impinging on a blazed reflective grating 6 as frequency splitter device. The split frequency components of beam component B2 impinge onto a far field mirror 408, in turn configured to divert the frequency components to the spectral sensor 405.

Figure 6:
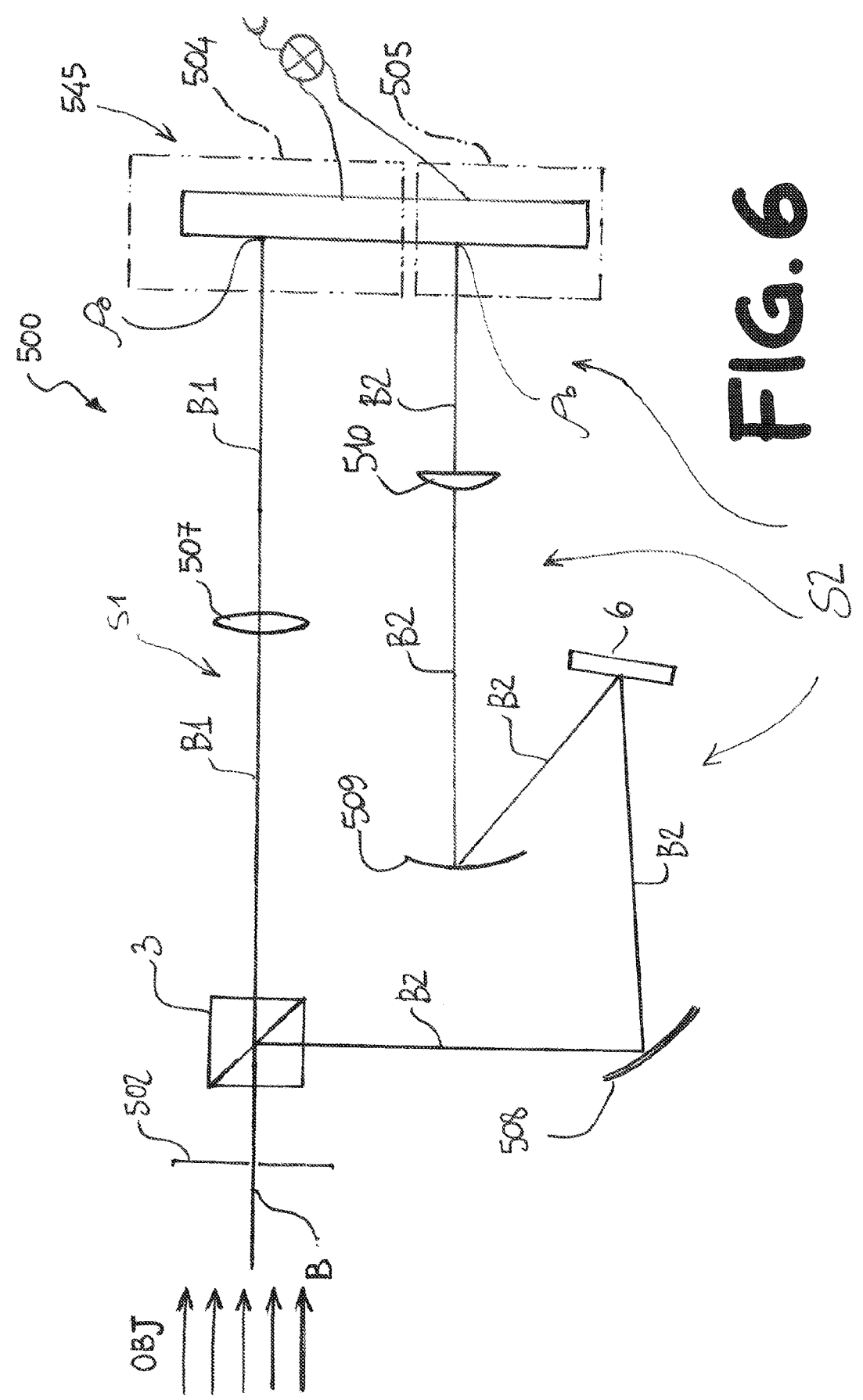
FIG. 6 is a schematic representation of a device according to yet further embodiments of the invention.
Figure 4:
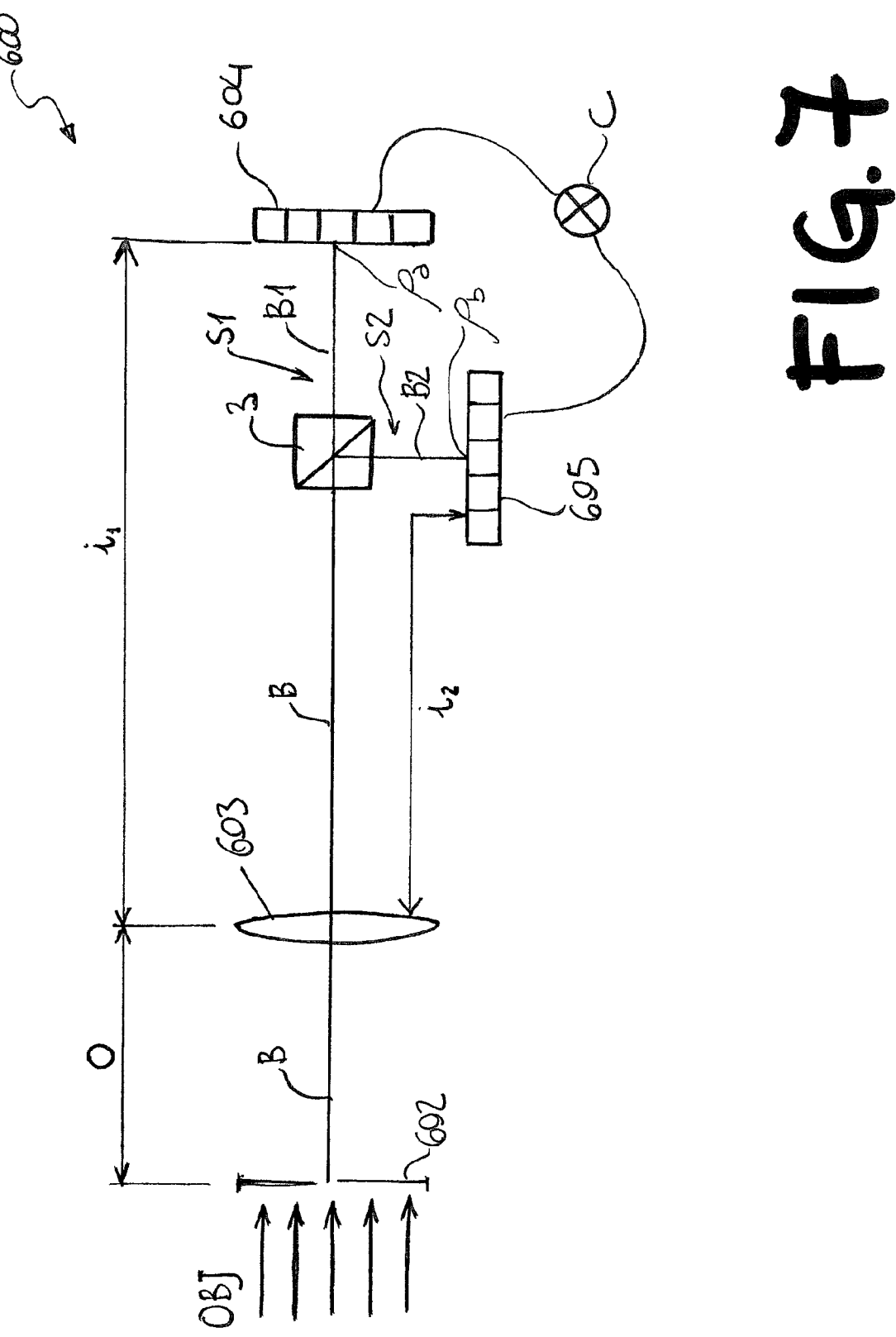

With reference to FIG. 6, yet a further embodiment of the device according to the invention is designated by reference number 500. In the device 500 the functional layout of the embodiment of FIG. 3 is again slightly varied as detailed in the following. At any rate, as far as the sensor section is concerned, the device 500 features a similar layout as the device 200, with an imaging sensor 504 and a spectral sensor 505 provided on a single sensor element 545 and correspond to different sensitive areas or elements of the sensor element 545. In this particular embodiment, the imaging sensor 504 corresponds to a first area of the sensor element 545, while the spectral sensor 505 corresponds to a second area of the sensor element 545, adjacent to the first area. As with the previously disclosed embodiments, the sensor areas are disjoint, namely the optical arrangement of the device 500 is such that there are no intersections between the secondary beams B1 and B2 that impinge upon the sensors 504, 505. The correlator C is, as with the previous embodiments, operatively connected to the sensors 405 and 505 to perform correlation of light intensity data/information retrieved by the sensors.

The device 500 includes an acquisition window 502 which comprise a lens or a set of lenses. The window 502 is in view of the beam splitter 3, so that the primary beam B from the object OBJ is split into the first secondary beam B1 with an optical path S1 traversing a second lens 507 and ending up on the imaging sensor 504, and a second secondary beam B2 with an optical path S2 impinging onto a collimating mirror 508, preferably of the parabolic type, which diverts the second secondary beam B2 to a reflective diffraction grating 6 as (which operates as a frequency splitter). The reflective diffraction grating 6 diverts the second secondary beam B2 to a focusing mirror 509, in turn focusing (and diverting) the second secondary beam B2—already split into frequency components thereof, to a cylindrical lens 510. The cylindrical lens focuses each frequency band in a line so that the spectrum information is acquired onto the spectral sensor 505 as an array of frequency-associated pixels (i.e. a line of pixels/sensing elements for each frequency band).

In a variant, the mirror 509 and the lens 510 can be provided as a set intended to focus the spectrum information onto single pixels, rather than pixel bands, to reduce the sensor area dedicated to spectral acquisition. In this way, areas of the sensor can be made available and "traded" to the spatial sensor 504 for additional resolution or else for plenoptic imaging capabilities. Additionally, with pixel focusing of the spectral signals the spectral sensor, which is a 2D sensor, can be replaced with a linear spectral sensor.

More in detail, arrangements of the mirror 509 and the lens 510 that provide pixel-focused spectral data onto the sensor 505 comprise one of the following:

i) The focusing mirror is a concave mirror exhibiting focusing properties only along the axis orthogonal to that of the lens 510;

ii) The mirror 509 is a circularly symmetric concave mirror and the lens 510 is a pair of cylindrical lenses, with axes orthogonal to one another;

iii) The mirror 509 is a plane mirror and the lens 510 is a pair of cylindrical lenses.

With reference to FIG. 7, yet a further embodiment of the device according to the invention is designated by reference number 600. The device 600 differs from all of the embodiments disclosed so far in that it does not include a separate frequency splitter device along the optical path of the secondary beams upstream of the spectral sensor. Instead, the frequency-dependent information is retrieved directly by the spectral sensor as will be disclosed in the following.

The device 600 includes an acquisition window 602 in view of a focusing lens 603 (which may itself be the acquisition window 602), and the beam splitter 3 downstream of the optical path of the light beam B emanating from the object OBJ. through the beam splitter 3, the primary beam B from the object OBJ is split into the first secondary beam B1 with an optical path S1 impinging on the imaging sensor 604, and a second secondary beam B2 with an optical path S2 impinging directly onto the spectral sensor 605. The correlator C is, as with the previous embodiments, operatively connected to the sensors 605 and 604 to perform correlation of light intensity data/information retrieved by the sensors 604, 605. The imaging sensor 604 and the spectral sensor 605 are preferably provided as physically distinct elements.

While the imaging sensor 604 does not differ from those already disclosed in respect of the other embodiments, the sensor 605 features a pixel matrix (or more in general a sensing elements matrix) wherein each pixel (or sensing element) has a spectral sensitivity peaked on a different frequency. This can be achieved through frequency selective coating of the sensor area, or else through a hybrid construction of the sensor so that it includes sensor elements which are physically peaked—as far as spectral sensitivity is concerned—on a specific frequency. This dispenses with the use of a separate frequency splitter device in that it is the very sensor 605 that performs frequency detection in the form of frequency-specific retrieval of the signals associated to the secondary beam B2. Light signals impinging the sensor 605 shall be representative of a signal contribution from the entire object: this requires that the following condition shall be verified:

$$\frac{1}{O} + \frac{1}{i_1} = \frac{1}{f'}; \rightarrow i_1 \neq i_2$$

Wherein O is the distance between the object OBJ and the plane of the lens 603, $i_1$ is the distance between the plane of the lens 603 and the imaging sensor 604, f' is the focal length of the lens 603, and $i_2$ is the distance between the focal plane of the lens 603 and the sensor 605. In order for the sensor 605 to gather primary light signals coming from the entire object OBJ, the sensor shall not be placed on a plane wherein the object OBJ is focused. A possible solution to this could be the arrangement of a lens, possibly a cylindrical lens, between the beam splitter 3 and the sensor 605 in order to have the image of the focusing lens 603 on the sensor 605. Otherwise, if the arrangement of an additional component is to be avoided, distance $i_2$ can be made very short as compared to $i_1$ which can be implemented by positioning the beam splitter 3 very close to the focusing lens 603.

Figure 8:
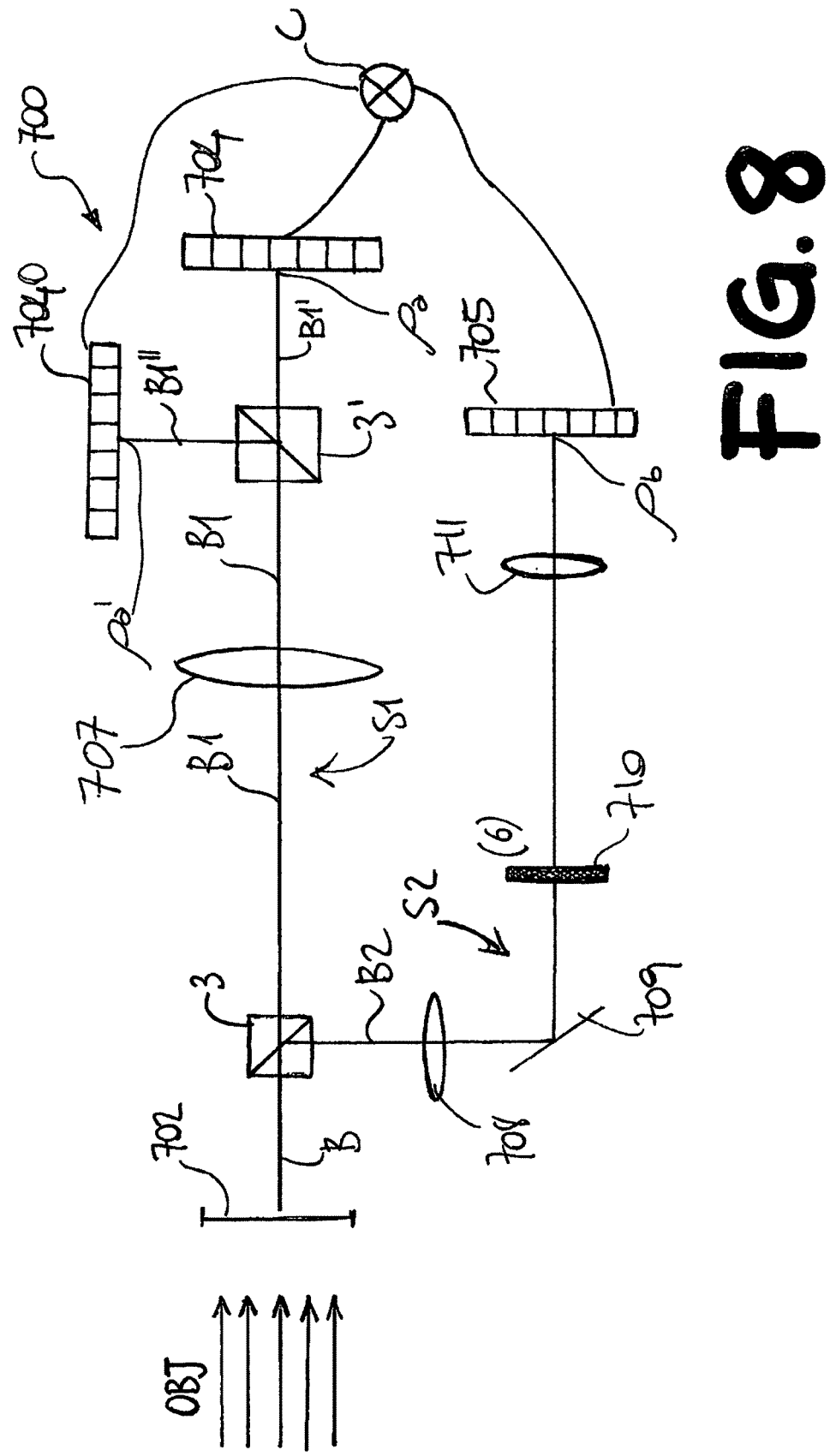
FIG. 8 is a schematic representation of a device according to yet further embodiments of the invention.

With reference to FIG. 8, yet a further embodiment of the device according to the invention is designated by reference number 700. The device 700 includes an acquisition window 702 which comprise a lens or a set of lenses. The window 702 is in view of the beam splitter 3, so that the primary beam B from the object OBJ is split into the first secondary beam B1 and the second secondary beam B2. As to the first secondary beam B1, it features an optical path S1 traversing a lens 707 and ending up on a second beam splitter 3' configured to split the secondary beam B1 into a third and a fourth secondary beams B1', B1", the former impinging onto a main imaging sensor 704, the latter impinging onto a secondary imaging sensor 7040. As to the second secondary beam S2, it features an optical path S2 traversing a collimating lens 708, diverted by a plane mirror 709 to a diffraction grating 710 as frequency splitter device, and further traversing a focusing lens 711 before impingement onto a spectral sensor 705. The correlator C is, as with the previous embodiments, operatively connected to the sensors 704 and 705 to perform correlation of light intensity data/information retrieved by the sensors, but it is also operatively connected to the sensor 7040.

In the device 700, thanks to the pairing of the spatial sensor 704 to the secondary spatial sensor 7040, the latter can be used to retrieve the focused image of the object OBJ on a plane other than the one focused on the "main" spatial sensor 704. This variant allows to perform 1) hyperspectral imaging of both the focused planes, by correlating the intensity on either the main spatial sensor 704 or the second sensor 7040 with the intensity on the spectral sensor 705; 2) 3D imaging by correlating the intensity on the two spatial sensors, exploiting the principle of "correlation plenoptic imaging between arbitrary planes", according to which the correlation between intensity fluctuations on two sensors on which the images of two different planes are focused enables one to reconstruct the direction of light in the scene, providing the possibility to refocus out-of-focus images, change the point of view on the scene and performing three-dimensional image reconstruction; 3) hyperspectral 3D imaging, by correlating the signals on all the three sensors. In this last case, the product of intensity fluctuations in each pair of points on the spatial sensors 704 and 7040 is correlated with the pixels of the spectral sensor corresponding to a given wavelength, to obtain the 3D image of the scene corresponding to that specific wavelength, according to the principle of correlation plenoptic imaging between arbitrary planes.

In general, the correlator C is configured to operate a correlation of data from the sensors 704, 7040 and 705 altogether, 704 and 7040 (plenoptic correlation), 704 and 705 (as with the previous embodiments), or else 7040 and 705.

Figure 9:
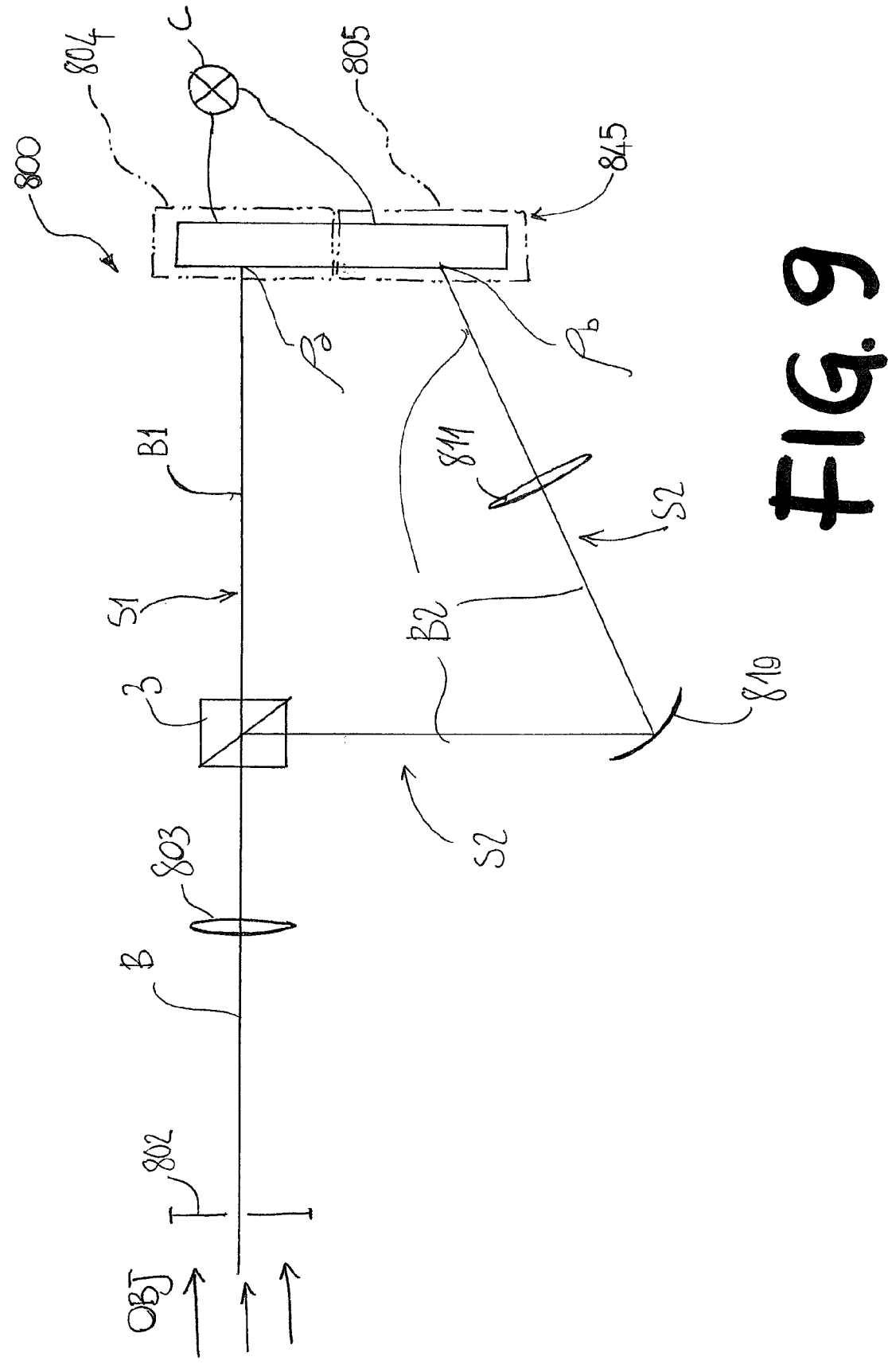
FIG. 9 is a schematic representation of a device according to yet further embodiments of the invention.

With reference to FIG. 9, yet a further embodiment of the device according to the invention is designated by reference number 800. The device 800 features certain similarities with the device 600 in that it does not include a separate frequency splitter device along the optical path of the secondary beams upstream of the spectral sensor. Instead, the frequency-dependent information is retrieved directly by the spectral sensor as will be disclosed in the following.

The device 800 includes an acquisition window 802 in view of a focusing lens 803 (which may itself be the acquisition window 802), and the beam splitter 3 downstream of the optical path of the light beam B emanating from the object OBJ. Through the beam splitter 3, the primary beam B from the object OBJ is split into the first secondary beam B1 with an optical path S1 impinging on an imaging sensor 804, and a second secondary beam B2 with an optical path S2 impinging onto a mirror 810—configured to divert the optical path S2 through a lens 811 and ultimately to the spectral sensor 805. The lens 803 focuses the image of the object OBJ to the beam splitter 3 and onto the sensor 804 (secondary beam B1), while the combination of the mirror 810 and the lens 811 process the second secondary beam B2 to return an image of the lens 803 (i.e. the image as resulting from the impingement of the primary light beam onto the lens 803) onto the spectral sensor 805, with the image being de-focused (i.e. rendered out of focus) to provide the sensor 805 with a secondary light beam (or secondary light signals) representative of light emanating from the whole object OBJ, as disclosed in respect of the imaging system 600. To this end, the following combinations may be envisaged:

a plane mirror 810 and a spherical lens 811 (bidimensional image of lens 803 on the sensor 805)

a concave mirror 810 and a cylindrical lens 811 having an axis arranged orthogonally to the drawing (linear image of lens 803 on the sensor 805), i.e. parallel to the plane of the second sensor 805.

The imaging sensor 804 and the spectral sensor 805 are provided on a single sensor element 845 and correspond to different sensitive areas or elements of the sensor element 845. In this particular embodiment, the imaging sensor 804 corresponds to a first area of the sensor element 845, while the spectral sensor 805 corresponds to a second area of the sensor element 845, adjacent to the first area. As with the previously disclosed embodiments, the sensor areas are disjoint, namely the optical arrangement of the device 800 is such that there are no intersections between the secondary beams B1 and B2 that impinge upon the sensors 804, 805. The correlator C is, as with the previous embodiments, operatively connected to the sensors 804 and 805 to perform correlation of light intensity data/information retrieved by the sensors.

In this case the sensor area devoted to spectral measurement (sensor area 805) features a pixel matrix (or more in general a sensing elements matrix) wherein each pixel (or sensing element) has a spectral sensitivity peaked on a different frequency. This—again—can be achieved through frequency selective coating of the sensor area, or else through a hybrid construction of the sensor so that it includes sensor elements which are physically peaked—as far as spectral sensitivity is concerned—on a specific frequency. This dispenses with the use of a separate frequency splitter device in that it is the very sensor (area) 805 that performs frequency detection in the form of frequency-specific retrieval of the signals associated to the secondary beam B2.

In all of the embodiments 1, 100, 200, 300, 400, 500, 600, 700, 800 disclosed herein, the spatial sensor 4, 204, 304,

404, 504, 604, 704, 7040, 804 may be an image acquisition sensor such as a bidimensional CCD, CMOS or s-CMOS camera, or even an array of photodiodes, or a SPAD array, while the spectral sensor 5, 205, 305, 405, 505, 605, 705, 805 may be either the same type as the spatial sensor, or else a line-scan camera.

According to the invention, in all of the embodiments herein the device 1, 100, 200, 300, 400, 500, 600, 700, 800 includes a processing unit configured to retrieve a hyperspectral image of the object OBJ through a measure of correlation between:

a first light intensity information retrieved at a spatial location on the first sensor 4, 204, 304, 404, 504, 604, 704 (and 7040 where applicable), 804 associated to a first light signal of the first secondary beam B1, the first light intensity carries information about the image of the object OBJ, and a second light intensity retrieved at a location on the second sensor 5, 205, 305, 405, 505, 605, 705, 805 associated to a second light signal of the second secondary beam B2 paired with the first light signal of the first secondary beam B1, the second light intensity information being provided for each frequency in the frequency spectrum information retrieved by the second sensor 5, 205, 305, 405, 505, 605, 705, 805 the measure of correlation being provided over an exposure time.

The full hyperspectral image is—accordingly—obtained by performing the measure of correlation for each spatial location of the image of the object OBJ, each spatial location being defined—as mentioned—by the impingement of a respective first secondary light signal of the first secondary beam B1 on the first sensor 4, 204, 304, 404, 504, 604, 704 (and 7040 where applicable), 804.

The following description is intended to provide a comprehensive disclosure of the operation of the device 1, 100, 200, 300, 400, 500, 600, 700, 800 and in general of the method for hyperspectral imaging according to the invention, the method being implemented through the hyperspectral device according to the invention in any of the embodiments disclosed in the foregoing.

The method according to the invention is based on measuring the correlation between the intensities $\bar{I}_a(\rho_a)$ and $\bar{I}_b(\rho_b)$ registered in subsequent simultaneous observations (frames) on each pair of points $\rho_a$ and $\rho_b$, one ($\rho_a$) on the imaging sensor 4, 204, 304, 404, 504, 604, 704, 804 and one ($\rho_b$) on the spectral sensor 5, 205, 305, 405, 505, 605, 705, 805. The points $\rho_a$ and $\rho_b$ are marked on each of FIGS. 1-5. Correlation is operatively measured through the correlator C which is either part, or connected to each hyperspectral imaging device 1, 100, 200, 300, 400, 500, 600, 700, 800.

The quantities $\bar{I}_a(\rho_a)$ and $\bar{I}_b(\rho_b)$ correspond, respectively, to the first light intensity information and the second light intensity information referred to in the foregoing and represent the time-average of light intensity over the exposure time $\Delta t$. More to the point, $\bar{I}_a(\rho_a)$ and $\bar{I}_b(\rho_b)$ are the time-average over the exposure time $\Delta t$ of the light intensity, corresponding, respectively, to the first light intensity and the second light intensity measured at the end of secondary light beams B1 and B2. Under the assumption that the average intensities $\bar{I}_j$ (with j=a; b) are obtained by measuring the light intensity at each point $\rho_j$ over a time window of duration $\Delta t$, considered Gaussian for computational convenience, the following applies,

11

$$T_j(\rho_j) = \int \frac{dt}{\Delta t} e^{-\frac{\pi t^2}{\Delta t^2}} I_j(\rho_j, t) \tag{1}$$

Accordingly, the hyperspectral image of the considered object OBJ is encoded in the quantity $$\Gamma(\rho_a,\rho_b) = \left\langle \overline{I_a(\rho_a)} \overline{I_b(\rho_b)} \right\rangle - \left\langle \overline{I_a(\rho_a)} \right\rangle \left\langle \overline{I_b(\rho_b)} \right\rangle \tag{1.1}$$

corresponding to the correlation of intensity fluctuations, wherein $\langle\ \rangle$ represents the mean value over the randomness of light coming from the object OBJ. If the object OBJ can be modelled as an ergodic source of light, such average substantially coincides with the mean value of the considered quantities over the collected frames.

Under the further assumptions that the light signal emitted by the object OBJ is stationary, namely that the expectation value of the physical quantities involving the light signal do not depend on a reference time, light emitted by the object OBJ has negligible transverse coherence, and its fluctuations approximately follow Gaussian distributions, the correlation of intensity fluctuations, defined in equation (2), reads, $$\Gamma(\rho_a, \rho_b) = \tag{2}$$

$$\frac{(\tau_c A_c)}{2\pi} \int \frac{dt}{\Delta t} \int \frac{dt'}{\Delta t} e^{-\frac{\pi(t^2+t'^2)}{\Delta t^2}} \times \left| \int d\omega \gamma((\rho_a, \rho_b; \omega) e^{-\frac{\tau_c^2}{2}(\omega-\omega_0)^2 - i\omega(t-t')} \right|^2$$

With $$\gamma(\rho_a, \rho_b; \omega) = \int d^2\rho_{OBJ} I_{OBJ}(\rho_{OBJ}, \omega) \times g_a(\rho_a, \rho_{OBJ}; \omega) g_b^*(\rho_b, \rho_{OBJ}; \omega) \tag{3}$$

Where $\tau_c$ is the coherence time of the observed light, corresponding to the inverse frequency bandwidth, $\omega_0$ is the central frequency of the observed light, $g_j(\rho_j, \rho_{OBJ}; \omega)$ is the function that propagates the component of the electromagnetic field corresponding to the frequency $\omega$ from point $\rho_{OBJ}$ of the object to point $\rho_j$ on the sensor/detector $D_j$, (with j=a, b; in this case $D_a$=sensor 4, 204, 304, 404,504, 604, 704, 804 $D_b$=sensor 5, 205, 305, 405, 505, 605, 705, 805). The product $$I_{OBJ}(\rho_{OBJ}, \omega) e^{-\frac{\tau_c^2}{2}(\omega-\omega_0)^2} \tag{4}$$

Is the component of light intensity on point $\rho_{OBJ}$ of the object corresponding to the frequency $\omega$ conveniently separated into a Gaussian envelope of width $$\tau_c^{-1}$$

and a slowly-varying function $I_{OBJ}$. The goal of hyperspectral imaging is to detect the function $I_{OBJ}(\rho_{OBJ}, \omega)$ for all points on the object plane with a fine frequency resolution. The key assumption to perform hyperspectral correlation imaging is that the propagator $\rho_a$, which determines the propagation of the secondary beam B1, entails a geometrical point-to-point correspondence between points on the object plane and points on the detector/sensor $D_a$, while the propagator $\rho_b$, which determines the propagation of the beam B2 is essentially independent of the object point and peaked around a frequency $\overline{\omega}(\rho_b)$ in the emission bandwidth:

$$g_j(\rho_j, \rho_{OBJ}; \omega) = C_b(\rho_b) e^{\frac{i\omega}{2cS_{OBJ}}\rho_{OBJ}^2} e^{-\frac{\tau_{cut}(\rho_b)^2}{4}(\omega-\overline{\omega}(\rho_b))^2} \tag{5}$$

With $S_{OBJ}$ being the distance between the object and the first principal plane of the imaging system, $C_b$ a constant that determines the intensity of the field transmitted towards $\rho_b$ and $$\tau_{cut}(\rho_b) = \tau_c \tag{6}$$

The inverse width of the frequency filtering operated by $g_b$ at the specific point.

Considering the assumptions discussed in the foregoing, and approximating the slowly-varying functions of intensity with the values thereof on the central filter frequency $\overline{\omega}(\rho_b)$, the following is obtained $$\Gamma(\rho_a, \rho_b) \Box \frac{|C_b(\rho_b)|^2 A_c^2 \tau_c^2}{\sqrt{\tau_c^2 + \frac{\tau_{cut}(\rho_b)^2}{2}} \sqrt{\tau_c^2 + \frac{\tau_{cut}(\rho_b)^2}{2} + \frac{2}{\pi}\Delta t^2}} \times \tag{7}$$

$$e^{-\left(\frac{1}{\tau_c^2} + 2\Box \tau_{cut}(\rho_b)^2\right)^{-1}(\omega_0 - \overline{\omega}(\rho_b))^2} G(\rho_a, \overline{\omega}(\rho_b))$$

With $$G(\rho_a, \overline{\omega}(\rho_b)) = \tag{8}$$

$$\left| \int d^2\rho_{OBJ} I_{OBJ}(\rho_{OBJ}, \overline{\omega}(\rho_b)) \times e^{\frac{-i\omega(\rho_b)}{2cS_{OBJ}}\rho_O^2} g_a(\rho_a, \rho_{OBJ}; \overline{\omega}(\rho_b)) \right|^2$$

properly encoding the image of the desired frequency component of the intensity profile. If the imaging system on the optical path a (which is the optical path a (see FIGS. 1, 2 for reference) is characterized by a focal length f and an effective aperture $P(\rho_l)$, the function (9) reads $$G(\rho_a, \overline{\omega}(\rho_b)) = \left( \frac{\overline{\omega}(\rho_b)^2}{(2\pi)^2 S_{OBJ} S_I} \right)^2 \tag{9}$$

$$\left| \int d^2\rho_{OBJ} I_{OBJ}(\rho_{OBJ}, \overline{\omega}(\rho_b)) \times \int d^2\rho_l P(\rho_l) e^{\frac{-i\omega(\rho_b)}{c}\rho_l\left(\frac{\rho_{OBJ}}{S_{OBJ}} + \frac{\rho_a}{S_I}\right)} \right|^2$$

The above function has the structure of a coherent-like image of the component of the intensity profile $I_{OBJ}$ corresponding to the frequency $\overline{\omega}(\rho_b)$ with a coherent point-spread function determined by the planar Fourier transform of the lens aperture.

In general, a set of different pixels on the sensor can correspond to the same frequency $\overline{\omega}(\rho_b)$. This kind of redundancy can be exploited to increase the signal-to-noise ratio associated to the frequency component $\bar{\omega}(\rho_b)$ by integrating the measured correlations over all the pixels corresponding to that frequency. Finally, notice that the device 1, 100, 200, 300, 400, 500, 600, 700, 800 can be employed for multispectral imaging, rather than hyperspectral imaging, by integrating the correlations over sets of pixels on the spectral sensor/detector Db, corresponding to wavelengths belonging to finite intervals (typically of width ≥20 nm).

In the most general case, the embodiment 700 can be employed to measure correlations between all three sensors 704, 7040, and 705, so as to gain simultaneous information on: 1) the spatial distribution of light from the object (i.e. the image), 2) the propagation direction of light coming from the object, and 3) the frequency spectrum of light coming from the object. The measurement of this correlation between the three sensors 704, 7040, and 705 is described by the quantity:

$$\Gamma^{(3)}(\rho_a, \rho'_a, \rho_b) = \langle \Delta \bar{I}_a(\rho_a) \Delta \bar{I}'_a(\rho'_a) \Delta \bar{I}_b(\rho_b) \rangle, \qquad (3)$$

Where $\Delta \bar{I}_a(\rho_a)$, $\Delta \bar{I}'_a(\rho'_a)$ and $\Delta \bar{I}_b(\rho_b)$ are the intensity fluctuations measured by the pixels of coordinate $\rho_a$ on the sensor 704, $\rho'_a$ on the sensor 7040, and $\rho_b$ on the sensor 705, computed as the difference between the intensities acquired during an exposure time $\Delta t$ and the average intensities. The quantity $\Gamma^{(3)}(\rho_a, \rho'_a, \rho_b)$, with varying $\rho_a$ and $\rho'_a$, and for each fixed value of $\rho_b$ corresponding to a specific frequency $\bar{\omega}(\rho_b)$, contains the plenoptic information on the scene (i.e., encodes both the spatial distribution and the direction of light, as required for refocusing images in post processing and performing tridimensional imaging) corresponding to that specific frequency.

Hence, all the results shown with reference to the embodiments 1, 100, 200, 300, 400, 500, 600, and 700 (limited to sensors 705 combined with wither 704 or 7040) also apply to the most general use of embodiment 700, which is further enriched by plenoptic information. The device and method for hyperspectral imaging disclosed herein overcome the technical problems of the prior art by replacing the intensity measurement performed by the single high-resolution 2D sensor of state-of-the-art methodologies, with the measurement of intensity (fluctuation) correlations retrieved by two high-resolution 2D sensors: one—the imaging/spatial sensor 4, 204, 304, 404, 504, 604, 704, 804—dedicated to polychromatic image acquisition, the other—the spectral sensor 5, 205, 305, 405, 505, 605, 705, 805—dedicated to pure spectral measurement.

In hyperspectral correlation imaging, the spectral information is encoded into the intensity correlation without requiring any spectral scanning. Even though multiple exposures (frames) are generally required to reconstruct light statistics and perform correlation measurements, the exposure times are several orders of magnitude shorter than those required in the scanning approach; in addition, no changes of the device are required during such multiple exposures: this simplifies the optics/optomechanics of the device 1, 100, 200, 300, 400, 500, 600, 700, 800 and avoids further time consumption.

On the other hand, since spatial and spectral information are retrieved by two different sensors, the spatial versus spectral resolution tradeoff, typical of state-of-the-art (intensity-based) snapshot hyperspectral imaging, is absent in the device and method according to the invention.

It is worth emphasizing that, besides the capability to obtain hyperspectral images through correlation measurements, the process and device of the present invention also retrieves, by means of the intensity measurement performed by the imaging (spatial) sensor 4, 204, 304, 404, 504, 604, 704, 804 the full-resolution panchromatic image of the object.

Yet further, all of the embodiments disclosed herein may be modified to feature plenoptic imaging capabilities, and to increase the depth of field accordingly.

Naturally, while the principle of the invention remains the same, the details of construction and the embodiments may widely vary with respect to what has been described and illustrated purely by way of example, without departing from the scope of the present invention.

The invention claimed is:

1. A device for hyperspectral correlation imaging comprising:
   an acquisition window,
   a beam splitter configured for splitting a primary light beam coming from an object and entering the acquisition window into a first secondary beam having a first optical path and including a plurality of first secondary light signals, and a second secondary beam having a second optical path and including a plurality of second secondary light signals,
   a first sensor configured to be impinged by the first secondary beam,
   a second sensor configured to be impinged by the second secondary beam,
   wherein:
   the first sensor is configured to retrieve, from the first secondary beam, an image of the object, the image comprising a plurality of spatial locations, each defined by the impingement of a first secondary light signal of the plurality of first secondary light signals on the first sensor, and
   the second sensor is configured to retrieve from the second secondary beam, and for each spatial location of the image, a frequency spectrum information,
   the device further including a processing unit configured to retrieve a hyperspectral image of the object through a measure of correlation between:
      a first light intensity information collected over an exposure time at a spatial location on the first sensor associated to the first secondary light signal of the plurality of first secondary light signals, and
      a second light intensity information collected over the exposure time at a location on the second sensor associated to a second secondary light signal of the plurality of second secondary light signals paired with the first secondary light signal of the first secondary beam, the second light intensity information being provided for each frequency in the frequency spectrum information retrieved by the second sensor,
   wherein said measure of correlation is a measure of statistical covariance between the first light intensity information collected over the exposure time and the second light intensity information collected over the exposure time.

2. The device of claim 1, wherein the first sensor and the second sensor are distinct sensors.

3. The device of claim 1, wherein the first sensor and the second sensor are provided on a single sensor element and correspond to different sensitive areas or elements of the single sensor element.

4. The device of claim 1, further including a frequency splitter device arranged along the second optical path and configured to process the second secondary beam to retrieve frequency components thereof upon interaction with the second sensor, wherein the frequency splitter device is configured to split the second secondary beam into frequency components thereof prior to impingement of the second secondary beam onto the second sensor.

5. The device of claim 1, wherein the second sensor comprises a sensing elements matrix, wherein each sensing element of the sensing elements matrix has a spectral sensitivity peaked on a different frequency.

6. The device of claim 4, wherein the acquisition window is arranged facing a first mirror configured to reflect incoming light beams from the object to a deviation mirror, the deviation mirror configured to divert the incoming light beams to the beam splitter, wherein the first secondary beam has a first optical path traversing an imaging lens, while the second secondary beam has a second optical path traversing a collimation lens which is arranged upstream of the frequency splitter device, and wherein a second mirror is arranged downstream of the frequency splitter to divert the split frequency components of the second secondary beam to the second sensor.

7. The device of claim 4, wherein the acquisition window is in view of the beam splitter, and wherein the first optical path traverses a lens to end up on the first sensor, and wherein the second optical path traverses the frequency splitter device and impinges onto a far field mirror, in turn configured to divert the split frequency components to the second sensor.

8. The device of claim 4, wherein the second secondary beam includes an optical path impinging onto a collimating mirror which is configured to divert the second secondary beam to the frequency splitter device, which is in turn configured to divert the second secondary beam to a focusing mirror, in turn focusing the second secondary beam to a cylindrical lens, wherein the cylindrical lens is configured to focus each frequency band in a line.

9. The device of claim 8, wherein the focusing mirror is a concave mirror exhibiting focusing properties only along an axis orthogonal to that of the cylindrical lens.

10. The device of claim 5, wherein the beam splitter is configured to split the primary beam into the first secondary beam with the first optical path impinging on the first sensor, and a second secondary beam with the second optical path impinging directly onto the second sensor.

11. The device of claim 1, comprising a second beam splitter configured to split the first secondary beam into a third and a fourth secondary beams, the third secondary beam configured to impinge onto said first sensor as a main imaging sensor, the fourth secondary beam configured to impinge onto a secondary imaging sensor, the secondary imaging sensor being configured to retrieve a focused image of the object on a plane other than a plane focused on the main imaging sensor.

12. The device of claim 1, comprising a first focusing lens configured to be impinged by the primary light beam, wherein the beam splitter is configured to split the primary light beam focused by the focusing lens into a first, focused secondary beam impinging the first sensor, and a second, focused secondary beam, wherein the second focused secondary beam is configured to be de-focused prior to impingement onto the second sensor by one of the following combinations:

a plane mirror and a spherical lens, and a concave mirror and a cylindrical lens having an axis arranged parallel to the plane of the second sensor.

13. A method for hyperspectral correlation imaging, comprising:

splitting a primary light beam into a first secondary beam including a plurality of first secondary light signals, and a second secondary beam including a plurality of second secondary light signals, directing the first secondary beam to a first sensor, directing the second secondary beam to a second sensor, retrieving, by means of the first sensor and from the first secondary beam, an image of an object, the image comprising a plurality of spatial locations, each defined by an impingement of a respective first secondary light signal of the first secondary beam on the first sensor, retrieving, by means of the second sensor and from the second secondary beam, a frequency spectrum information for each of the plurality of spatial locations of the image, and retrieving a hyperspectral image of the object through a measure of correlation between:

a first light intensity information collected over an exposure time at a spatial location on the first sensor associated to a first secondary light signal of the first secondary beam, and a second light intensity information collected over the exposure time at a location on the second sensor associated to a second secondary light signal of the second secondary beam paired with the first secondary light signal of the first secondary beam, the second light intensity information being provided for each frequency in the frequency spectrum information retrieved by the second sensor, wherein said measure of correlation is a measure of statistical covariance between the first light intensity information collected over the exposure time and the second light intensity information collected over the exposure time.

14. The method of claim 13, wherein the first sensor and the second sensor are provided on a single sensor element and correspond to different sensitive areas or elements of the single sensor element.

15. The method of claim 13, comprising splitting the second secondary beam into frequency components thereof prior to impingement on the second sensor.

16. The method of claim 13, wherein the second sensor comprises a sensing elements matrix, wherein each sensing element of the sensing element matrix has a spectral sensitivity peaked on a different frequency.

17. The method of claim 13, further comprising:

splitting the first secondary light beam into a third and a fourth secondary beams, directing the third secondary beam to the first sensor and the fourth secondary beam to a further sensor configured for retrieving an image of the object, and retrieving an image of the object on a plane, the plane being other than a plane that the first sensor retrieves data from, through the further sensor.

* * * * *